(No Model.)
S. HALVOSSEN.
SKID.
No. 282,311. Patented July 31, 1883.
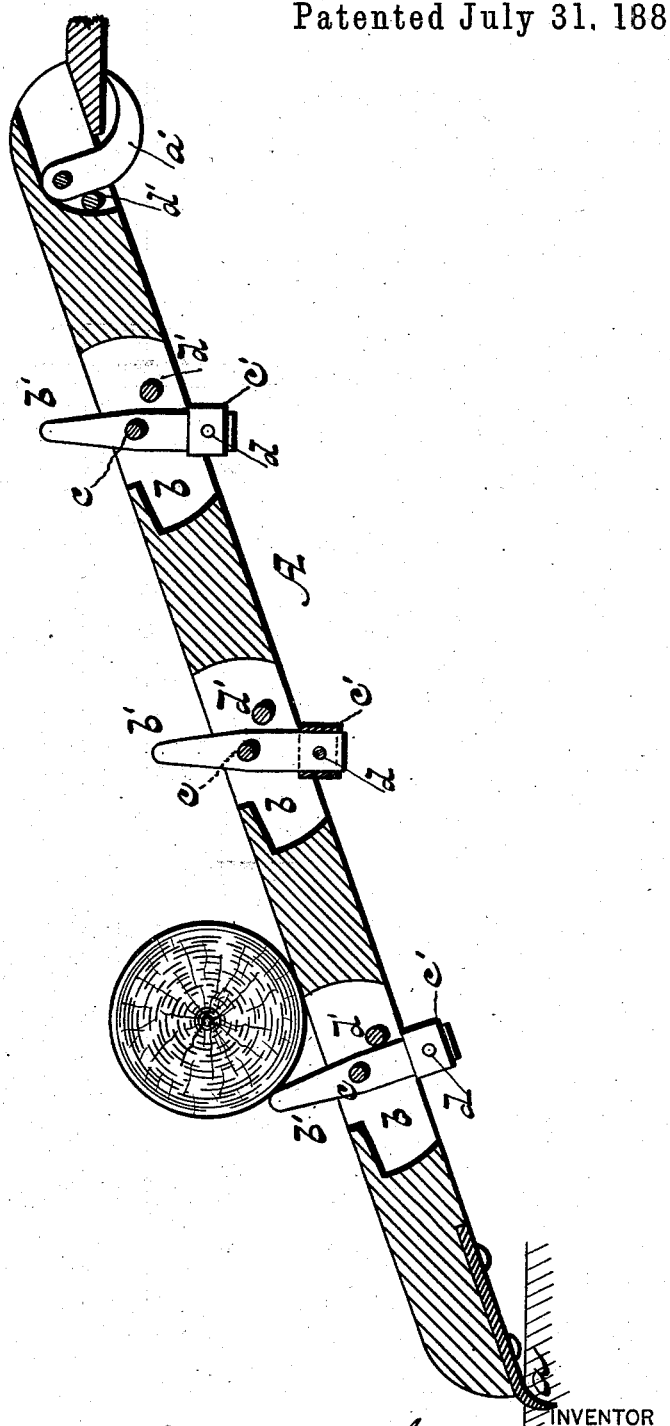
WITNESSES
INVENTOR
Soren Halvossen
by Wm H Bates and Co.
his ATTORNEYS

United States Patent Office.

SOREN HALVOSSEN, OF WINCHESTER, WISCONSIN.

SKID.

SPECIFICATION forming part of Letters Patent No. 282,311, dated July 31, 1883.

Application filed April 12, 1883. (No model.)

*To all whom it may concern:*

Be it known that I, SOREN HALVOSSEN, a citizen of the United States, residing at Winchester, in the county of Winnebago and State of Wisconsin, have invented certain new and useful Improvements in Skids, of which the following is a specification, reference being had therein to the accompanying drawing.

This invention has relation to improvements in skids; and it consists in the construction and novel arrangement of the same, as will be hereinafter more fully explained.

The annexed drawing, to which reference is made, fully illustrates my invention and represents a vertical sectional view of my skid.

Referring by letter to the accompanying drawing, A designates a bar of any suitable length and thickness, constructed preferably of wood, at one end of which the same is provided with a spur, $a$, and at the opposite end said bar is also provided with a pivoted hook, $a'$, all for a purpose further herein set forth. Said bar A is further provided with slots $b$, arranged vertically therein, in which are pivoted weighted dogs $b'$, by means of transverse pins $c$, passing through said dogs at or about their center, as shown in the drawing.

At one end of each of the dogs $b'$ the same is provided with a weight, $c'$, that is slotted to receive said dog, and secured thereto by a pin, $d$. In front of each dog, and a little distance below the pivot-pins $c$, and arranged transversely across the slots $b$, are stop-pins $d'$, against which the weighted ends of the dog strike when the opposite ends are bearing the weight of a log.

It will be observed from the above description, and by reference to the annexed drawing, that in operation the hook end of the skid is placed upon a sleigh-body or a wagon, and the hook $a'$ serves to hold this end thereto, while the spur $a$ bites the ground, and, being in an inclined position, the dogs, by means of the weights $c$, are caused to stand vertically, with the upper ends projecting above the upper surface of the bar; and it will further be seen that when a log is rolled up the inclined bar the same strikes the dogs and forces them into the slots, and after passing far enough beyond the pivotal center the dogs swing by means of their weighted ends into their former position, when the log is rested upon the same and supported by said dogs and the stop-pins.

Having described my invention, what I claim, and desire to secure by Letters Patent, is—

1. In a skid, the combination, with the bar A, slotted as described, of the pivoted dogs $b'$, provided with a weight slotted to receive the ends of said dogs, and secured thereto by pins $d$, of the stop-pins $d'$, whereby the movements of the dogs are checked and supported, as shown and described.

2. The combination, in a skid constructed with slots, as described, of the pivoted weighted dogs $b'$, stop-pins $d'$, and hook $a'$, pivoted at the upper end and provided with a stop-pin in rear to support said hook, as shown and described.

In testimony whereof I affix my signature in presence of two witnesses.

SOREN HALVOSSEN.

Witnesses:
JAS. H. JONES,
LOUIS JUV.